United States Patent [19]
Katagiri et al.

[11] Patent Number: 6,006,416
[45] Date of Patent: Dec. 28, 1999

[54] METHOD OF MOUNTING PERMANENT MAGNET

[75] Inventors: Masayuki Katagiri; Hiromitsu Takei, both of Nagano, Japan

[73] Assignee: Kabushiki Kaisha Sankyo Seiki Seisakusho, Nagano, Japan

[21] Appl. No.: 09/123,420

[22] Filed: Jul. 28, 1998

[30]     Foreign Application Priority Data

Jul. 28, 1997  [JP]  Japan .................................. 9-217134

[51] Int. Cl.⁶ .................................................. H02K 15/14
[52] U.S. Cl. ................................. 29/596; 29/732; 29/736
[58] Field of Search .............................. 29/596, 598, 732, 29/736; 310/89, 90, 91

[56]          References Cited
          U.S. PATENT DOCUMENTS 5,661,894   9/1997   Kawasaki et al. ......................... 29/596

*Primary Examiner*—Carl E. Hall
*Attorney, Agent, or Firm*—Sughrue, Mion, Zinn, Macpeak & Seas, PLLC

[57]          ABSTRACT

In one face of an annular permanent magnet 20, notch recesses 30 and 31 are formed in diameter directions which are different in phase by 90° and used as positioning recesses 30 and fixing recesses 31. The positioning recesses 30 are positioned with respect to a mounting jig 41 by keys 61 which are similar to a magnetizing head, and fixed in the portions of the fixing recesses 31 by plastic working which is performed on an end face 62 of a case 18 by incision and bend cutters 48. Therefore, both the magnetization and the mounting can be performed by using the same reference, i.e., the positioning recesses 30 of the permanent magnet 20, and hence the accuracy of the magnetized positions can be ensured.

5 Claims, 4 Drawing Sheets

METHOD OF MOUNTING PERMANENT MAGNET

BACKGROUND OF THE INVENTION

1. Field of the Invention

The present invention relates to a small DC motor, and more particularly to fixing magnetized position setting means for a permanent magnet and means for fixing the permanent magnet to a case constituting a motor case.

2. Related Art

In a small DC motor 100 such as that shown in FIG. 9, usually, an annular permanent magnet 102 which is produced by sinter forming is attached to the inside of a cup-like motor case 101, and the outer peripheral face of an armature 106 which is rotated integrally with a rotary shaft 105 supported on a bearing 104 is opposed to the inner wall face 103 of the annular permanent magnet 102 with maintaining a predetermined gap d. A commutator unit 108 having a plurality of slits in the circumferential direction is fitted onto the rotary shaft 105. A pair of brushes 109 are slidingly contacted with the commutator unit 108, so that coils 107 of the armature 106 are energized via the brushes 109 and the commutator unit 108. In the small brush DC motor, the switching accuracy of the energization of the coils, i.e., that of the polarity switching depends on relative positional relationships among the magnetized positions of the permanent magnet 102 with respect to the motor case 101, the positions of the slits of the commutator unit 108 with respect to the salient poles of the armature core 106, the positions where the brushes 109 are slidingly contacted with the commutator unit 108, and the position where the brushes 109 are fixed with respect to the motor case 101 to which the permanent magnet 102 is attached. When the positional relationships are not matched with each other or any one of the positions is deviated, torque ripple and cogging are increased, thereby impairing the characteristics of the motor. The phase number of the motor, i.e., the number of operations of switching the polarity may be increased in order to increase the torque of a motor, reduce the power consumption, and reduce the size of a motor. In such a case, particularly, the impairment of the motor characteristics due to such positional relationships becomes remarkable.

Therefore, means for enhancing the positional accuracy of the permanent magnet with respect to the motor magnet is considered.

In the small DC motor 100 of the prior art, usually, means for positioning and fixing the annular permanent magnet 102 to the inside of the cup-like motor case 101 is realized by bonding means using an adhesive agent, or integral molding means for outsert molding the annular permanent magnet and the cup-like case.

In the case of the bonding means using an adhesive agent, however, there is no reference for positioning, and the positional accuracy between the magnetized positions and the fixing position in the case becomes unstable. Furthermore, there arise disadvantages that the bonding strength is not stabilized because of the application thickness of the adhesive agent, uneven application, the ambient temperature, the curing time, and the like, and that the adhesive agent may be applied to an undesirable place.

By contrast, in the case of the integral molding means by outsert molding, the positional accuracy between the magnetized positions and the case can be sufficiently ensured by performing integral molding before magnetization. However, the cup-like case has the bottom, and hence the bottom obstructs the magnetization, so that the total magnetization is hardly performed. Furthermore, the integral molding means involves dispersion of magnetization due to misalignment, and hence the rotation torque characteristics of the motor are impaired. When integral molding is performed after magnetization, the molding temperature causes the magnetizing force to be impaired.

SUMMARY OF THE INVENTION

It is an object of the invention to provide a method of mounting a permanent magnet in which magnetized positions of a permanent magnet with respect to a motor case can be correctly ensured, and as a result torque ripple and cogging can be reduced.

According to an aspect of the present invention, there is provided a method of mounting a permanent magnet comprising the steps of:

forming a positioning recess and a fixing recess in one end face of an annular permanent magnet;

applying predetermined magnetization on said permanent magnet under a condition that a projection which is to be engaged with said positioning recess is disposed on a magnetizing device and said projection of said magnetizing device is engaged with said positioning recess of said permanent magnet, thereby positioning said permanent magnet;

positioning said positioning recess of said permanent magnet which has undergone said magnetizing step, with respect to a mounting jig;

positioning a cylindrical motor case on said mounting jig;

fittingly inserting said permanent magnet which has been positioned, into said motor case which has been positioned; and plastically deforming a part of said motor case and engaging said part with said fixing recess of said permanent magnet, thereby fixing said permanent magnet.

In the method of mounting a permanent magnet according to the invention, a positioning recess is formed in an end face of the permanent magnet so that the positioning of the magnetization and that of the mounting of the magnet to the case are then performed.

Therefore, the assembly accuracy of the magnetized positions are largely improved. The positioning recess, the fixing recess, and the projection can prevent the front and rear of the magnet and the directions of the magnetized positions with respect to the rotational direction from being erroneously recognized. As a result, torque ripple and cogging of the motor can be reduced.

Moreover, the fixing recess is additionally formed in the end face of the permanent magnet and the permanent magnet is fixed by bending the end face of the case. Therefore, it is not required to use an adhesive agent, and the permanent magnet can be detached so as to be reused, whereby the amount of wastes can be reduced.

The projection formed on the other face of permanent magnet facilitates the adjustment of the magnetic center in the thrust direction with respect to the armature core, and reduce the working to margin of the permanent magnet so that the material cost is reduced. As a result, the production cost can be extremely lowered.

Further, the recess is formed on one end face of the permanent magnet and the projection is formed on the other end face at the position corresponding to the recess. When permanent magnet blanks before assembly are to be accumulated, the magnets can be sequentially stacked while the recess of a magnet is inserted onto the projection of the adjacent magnet. Consequently, the stability in the lateral direction can be ensured, and this configuration is convenient for storage and transportation.

BRIEF DESCRIPTION OF THE DRAWINGS

FIG. 7(A) is an enlarged view of a portion indicated by A and illustrating the function of an incision and bend cutter.

DETAILED DESCRIPTION OF THE PREFERRED EMBODIMENTS

Hereinafter, an embodiment of the method of mounting a permanent magnet according to the invention will be described by illustrating a small brush DC motor 10 shown in FIG. 1.

Figure 1:
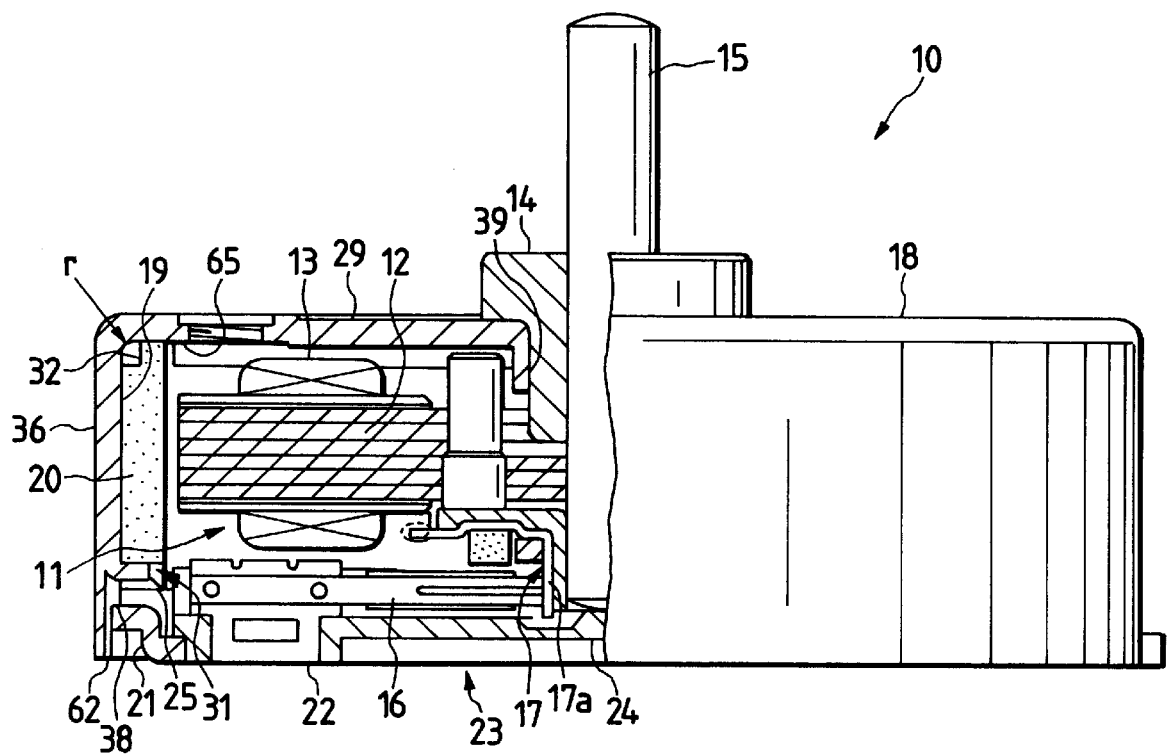
FIG. 1 is a side view showing a small DC motor produced by using the method of mounting a permanent magnet according to the invention, partly in section.

In the small brush DC motor 10 of FIG. 1, 11 designates an armature in which coils 13 are respectively wound on a plurality of salient poles 12. A rotary shaft 15 which is rotatably supported on a bearing 14 is passed through and fixed to the center portion of the armature. The rotary shaft 15 is passed through and fixed to a commutator unit 17 which is electrically connected to the coils 13. The commutator unit 17 has commutator pieces 17a the number of which corresponds to the phase number of the motor, and slits which are respectively formed between the adjusting commutator pieces 17a. Brushes 16 for power supply, which are implanted in a cover plate 21, are slidingly contacted with the commutator unit 17.

When a current is supplied to the brushes 16 that is to say when, the current is supplied to the coil 13 via the commutator unit 17 which is slidingly contacted with the brushes 16, a magnetic field for rotating is formed by the salient pole 12 around, which the coil 13 is wound, and a permanent magnet 20, which is opposed to the salient pole 12. When the armature 11 having the salient poles 12 is rotated, the commutator unit 17 which is to be slidingly contacted with the brushes 16 is switched to another one via the slits so that a current is supplied to the coil 13 of the next phase. In this way, the switching of energization is repeated and the armature 11 is continuously rotated.

Figure 2:
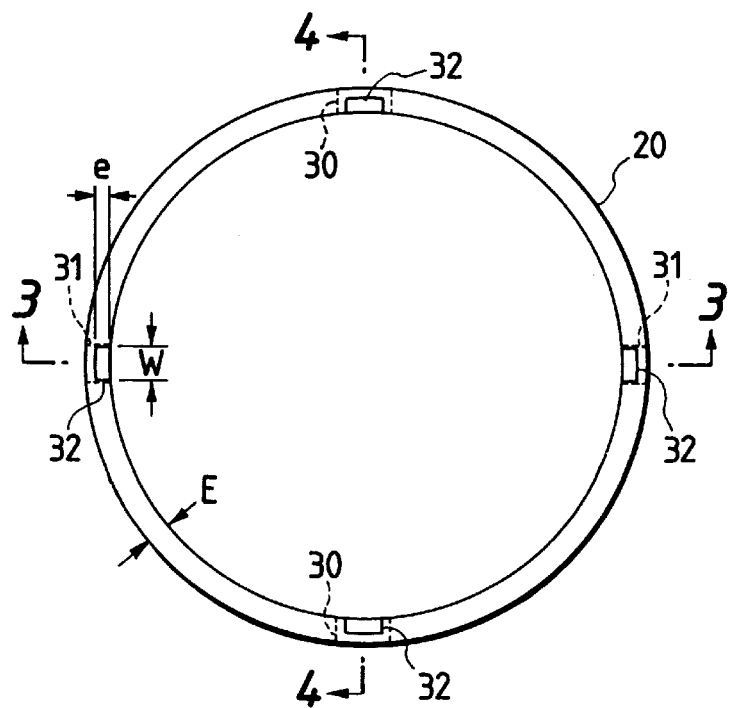
FIG. 2 is a plan view of a permanent magnet in the method of mounting a permanent magnet according to the invention.

The reference numeral 18 designates a motor case which is made of a ferromagnetic material. The permanent magnet 20 in which a plurality of poles are magnetized is attached to the inner wall 19 of the motor case. As shown in FIG. 2, the permanent magnet 20 has positioning recesses 30 and fixing recesses 31 which are formed in one end face 27, and projections 32 which are formed on the other end face 28. The cover plate 21 holds the power-supply brushes 16 via a holder 22, and closes an opening 23 of the motor case 18.

The rotary shaft 15 is supported in the axial direction by a thrust bearing 24 which is fixed to the cover plate 21.

The reference numeral 25 designates engaging claws which are formed by plastically deforming parts of the motor case 18 and which are to be engaged with the fixing recesses 31 of the permanent magnet 20, respectively. After or at the same time when the permanent magnet 20 is fitted into the motor case 18, parts of an end face 62 of the peripheral wall inside the motor case 18 and corresponding to the fixing recesses 31 are incised and peeled from the surrounding material by press working, thereby forming the engaging claws 25. Thereafter, the engaging claws 25 are bent at the root portion to be engaged with the fixing recesses 31, respectively, whereby the position of the permanent magnet 20 is settled and the magnet is fixed in the motor case 18.

When a defect is to be eliminated after assembling, the engaging claws 25 are broken or raised and the permanent magnet 20 is then separated from the motor case 18 and removed away therefrom, and the magnet can be reused. When the permanent magnet 20 is fixed to the motor case 18 by means of an adhesive agent or outsert molding, it is difficult to disassemble the motor. When the structure of the embodiment is employed, it is possible to cut wastes due to production steps.

Figure 3:
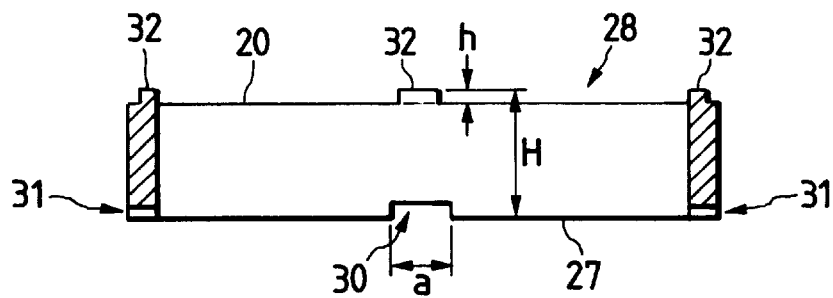
FIG. 3 is a section view taken along the line 3—3 of FIG. 2.
Figure 4:
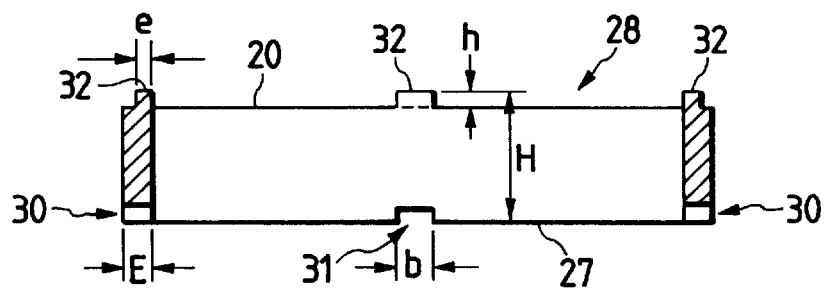
FIG. 4 is a section view taken along the line 4—4 of FIG. 2.

FIG. 2 is a plan view of a mold product of the annular permanent magnet 20 according to the invention, FIG. 3 is a section view taken along the line 3—3, and FIG. 4 is a section view taken along the line 4—4. Referring to FIG. 2, two pairs of notches are formed in the one end face 27 of the permanent magnet 20. One pair of the notch is used for positioning recesses 30 and the other is used for fixing recesses 31. Each pair includes two notches formed into the same shape and positioned to be separate from each other by 90° in phase, that is to say, opposed to each other at both ends of diameter line of the annular permanent magnet.

In FIGS. 3 and 4, the positioning recesses 30 and the fixing recesses 31 are shown so as to have different dimensions. Alternatively, these recesses may be formed as notches of the common dimensions and the same shape.

On the other end face 28 of the permanent magnet 20, projections 32 are disposed at positions of the circumference which are the same in phase as the positioning recesses 30 and the fixing recesses 31. The height h of the projections 32 is equal to or slightly larger than the radius of a corner r of the motor case 18, and the width w is set so as to allow the projections to be inserted into the narrower pair of the positioning recesses 30 and the fixing recesses 31, or, for example, the pair of the fixing recesses 31. The thickness e is set so that the outer peripheral side is gradually reduced with starting from the thickness E of the annular wall of the permanent magnet 20 and the inner side narrowly remains, whereby the outer edge of the permanent magnet 20 is prevented from interfering with the corner r of the case 18.

The assembly height H of the permanent magnet 20 can be adjusted by adjusting only the small faces of the projections 32 of the height h. Therefore, the cutting amount can be reduced so that the material is not wastefully used, thereby lowering the material cost. Furthermore, the working is facilitated and can be rapidly performed, and hence the adjusting time can be shortened.

When the permanent magnets 20 are to be accumulated or transported, the magnets can be sequentially stacked while the recesses of a magnet are fitted onto the projections of the adjacent magnet. Consequently, the magnets can be stably stacked in series, so that a large number of magnets can be handled at one time.

Figure 5:
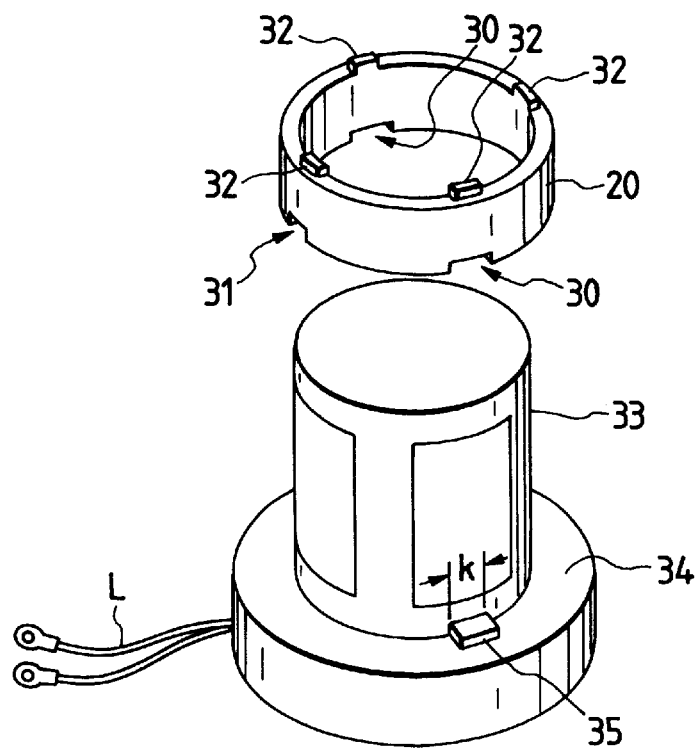
FIG. 5 is a perspective view illustrating an embodiment of a magnetizing step in the method of mounting a permanent magnet according to the invention.

Next, the step of magnetizing the permanent magnet 20 will be described with reference to FIG. 5. In this case, since the accuracy of the positions of the poles is important, magnetization is performed while keys 35 serving as projections which can be inserted into the positioning recesses 30 of the permanent magnet 20 are previously formed on the base face 34 of a magnetizing head 33 and the positioning recesses 30 are engaged with the keys 35, respectively. According to this configuration, the positions of the poles with respect to the positioning recesses 30 can be accurately determined. In the figure, L designates a cord for connection with the power source.

The width a of the positioning recesses 30 is set to be larger than the width b of the fixing recesses 31, and the width k of the keys 35 of the magnetizing head 33 is set to be suitable to the width a of the positioning recesses 30, thereby allowing only the positioning recesses 30 to be engaged with the keys 35 of the magnetizing head 33. In this way, only the positioning recesses 30 are allowed to participate in the positioning operation, so that the positions of the poles can be brought in one-to-one correspondence and always checked.

Figure 6:
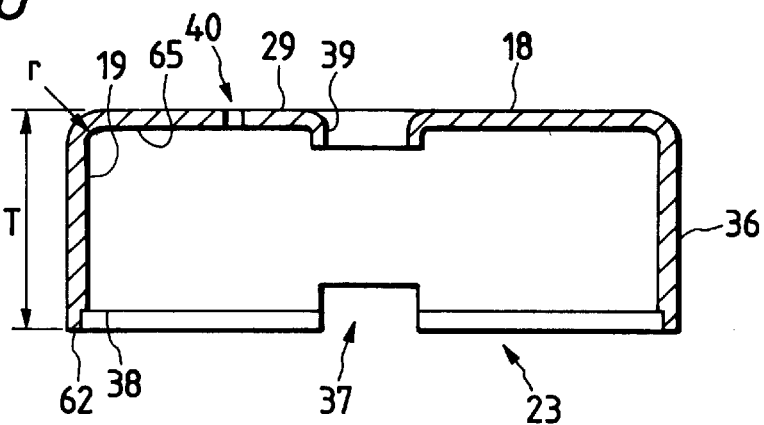
FIG. 6 is a side section view of a cup-like case in the method of mounting a permanent magnet according to the invention.

FIG. 6 is a side section view of the motor case 18. Notch recesses 37 which respectively correspond to the positioning recesses 30 disposed on the permanent magnet 20 are formed in the opening 23 of the peripheral wall 36. The inner diameter of the motor case 18 is substantially equal to or slightly larger than the outer diameter of the permanent magnet 20 so that the permanent magnet 20 can be pressingly inserted into the motor case 18 by fitting at the extent of transition fit. In order to fit the cover plate 21 into the opening 23, a step 38 is formed in the peripheral edge of the opening 23, thereby increasing the diameter. A recessed hole 39 serves as a fitting attachment portion for the bearing 14. A through hole 40 is used for performing positioning in the circumferential direction, and has constant positional relationships with respect to the notch recesses 37.

Figure 7:
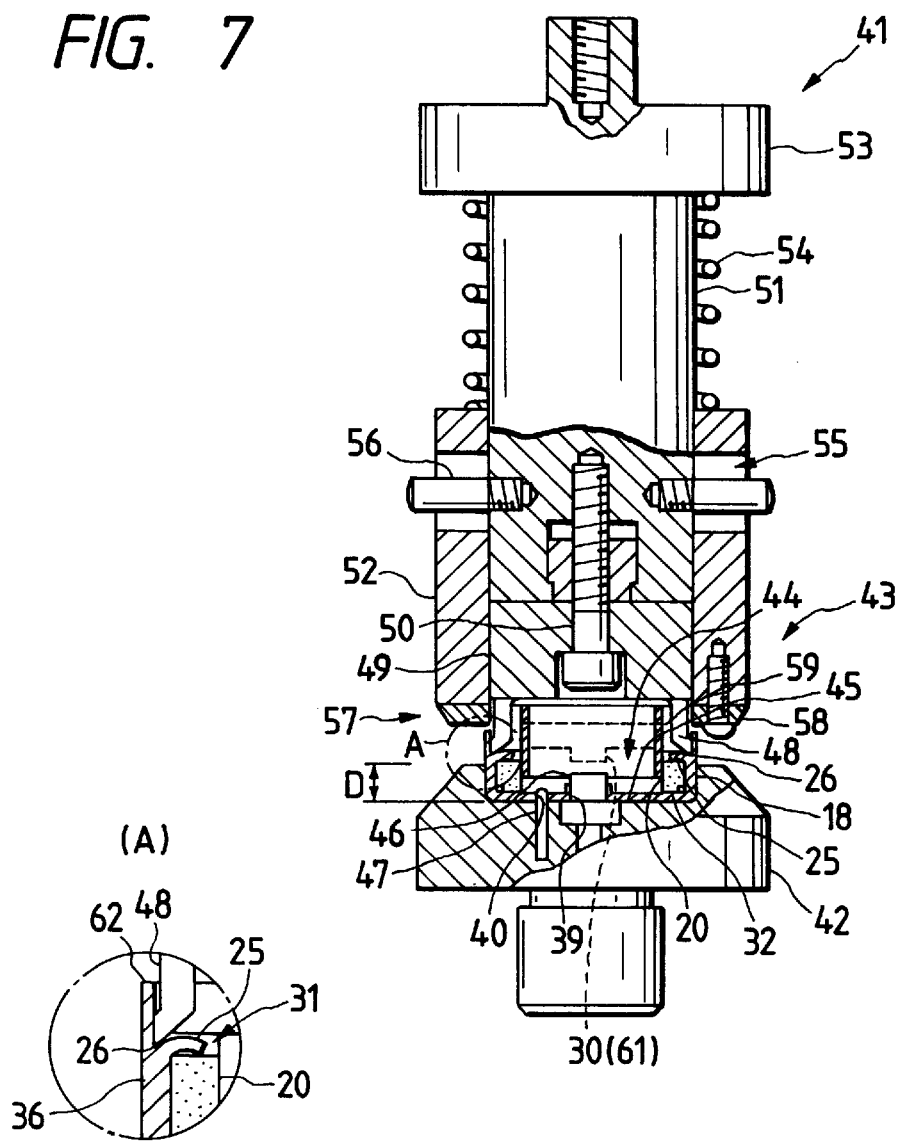
FIG. 7 is a schematic side view showing an embodiment of a mounting jig in the method of mounting a permanent magnet according to the invention.

After magnetization, the permanent magnet 20 is mounted into the motor case 18. This mounting is performed by using a mounting jig 41 as shown in FIG. 7. An anvil (fixing block) 42 and a jig head 43 are arranged on the stroke line of a press machine (not shown) with aligning their center axes. The anvil 42 and the jig head 43 are moved in the axial direction while maintaining constant their positions relating to the phase relationships in the circumferential direction.

The anvil (fixing block)42 includes, a concave mold 44, the diameter of which is same as the outer diameter of the motor case 18, on the face opposed to the jig head 43. And the motor case 18 is fitted into the concave mold 44. The depth D of the concave mold 44 is not larger than or is substantially equal to the length T in the axial direction of the motor case 18. A boss 46 which is to be fitted into the recessed hole 39 of the motor case 18 protrudes from the center of the bottom face 45 of the concave mold 44. A pin 47 which is to be fitted into the through hole 40 upstands at a position which is separated from the boss in a radial direction. The pin 47 is used for positioning the motor case 18. When the motor case 18 is positioned and the attachment of the permanent magnet 20 is ended, the boss 46 is mechanically raised to be used for pushing out the motor case 18 from the concave mold 44.

In the jig head 43, a cutter block 49 is fixed to the center of a core bar 51 by a bolt 50. The cutter block has an incision and bend cutter 48 in at least two positions which correspond to the fixing recesses 31 of the permanent magnet 20 and which are in the diameter direction. The jig head comprises: a sleeve 52 which slides around the core bar 51; a compression spring 54 which is between a flange 53 of the core bar 51 and the sleeve 52 and which downward urges the sleeve 52 toward the anvil 42; and guide pins 56 which are engaged with slots 55 formed in the side face of the sleeve 52 to restrict the range of the movement of the sleeve 52 due to the urging force of the compression spring 54 and also to linearly guide the sleeve. The positional relationship in the circumferential direction between the incision and bend cutters 48 and the sleeve 52 is kept to be constant by the rotation locking function of the guide pins 56 which upstand from the side face of the core bar 51.

An attachment guide member 57 is fixed to the lower end face of the sleeve 52 which is opposed to the anvil (fixing block) 42, via a flange 58. The outer diameter of an inner ring 59 of the attachment guide member 57 is fitted with the inner diameter of the permanent magnet 20, and keys 61 upstanding from an outer wall end face 60 of the attachment guide member 57 can be fitted into the positioning recesses 30, respectively (see FIG. 8).

The attachment guide member 57 is made of a ferromagnetic material. When the permanent magnet 20 is fittingly inserted into the inner ring 59 and the positioning recesses 30 is positioned with respect to the keys 61 and inserted thereonto, therefore, the permanent magnet 20 is attracted to the attachment guide member 57 by the own magnetic force, and the one face 27 of the permanent magnet in which the notches 30 and 31 are formed is closely contacted with the outer wall end face 60. As a result, the magnetized positions in the circumferential direction can be accurately determined, and the constant positional relationships in the circumferential direction are naturally established between the permanent magnet and the motor case 18 which is positioned by the pin 47 in the circumferential direction with respect to the anvil (fixing block) 42.

Figure 8:
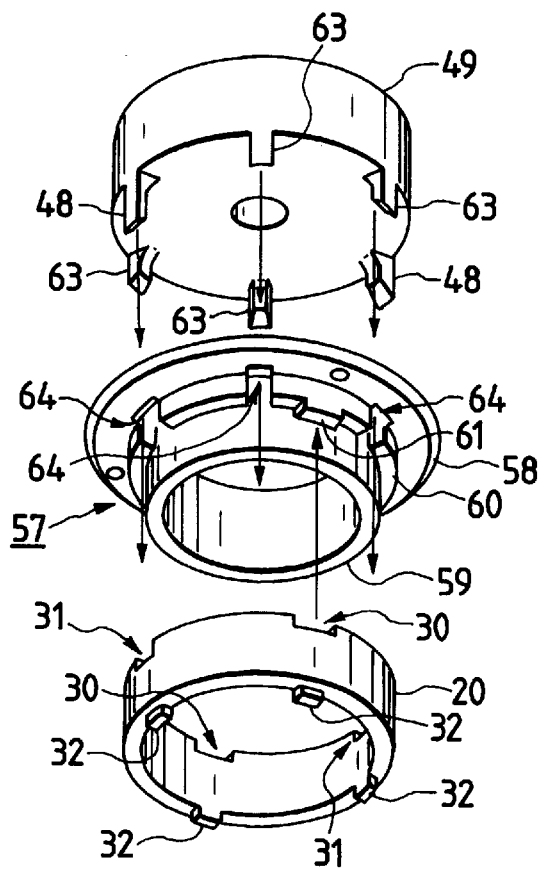
FIG. 8 is a schematic expanded perspective view showing an embodiment of an attachment guide member in the method of mounting a permanent magnet according to the invention.
Figure 9:
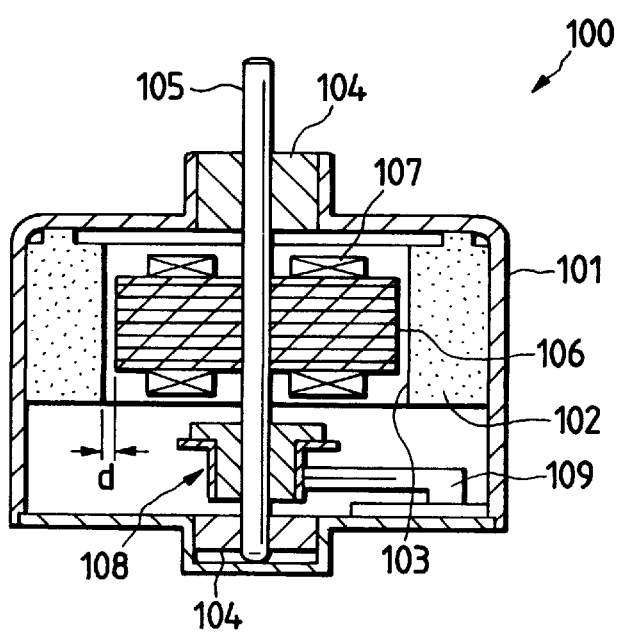
FIG. 9 is a side section view of a small DC motor of the conventional art.

On the other hand, in the attachment guide member 57 fixed to the sleeve 52, square holes 64 through which the cutters 48 fixed to the core bar 51 are passed so as to be guided and which have a shape identical with the section shape of the cutters 48 are opened at positions corresponding to the cutters 48 (see FIG. 8). When the jig head 43 is at an upper position or separated from the anvil 42, the sleeve 52 which is downward urged by expansion of the compression spring 54 is restricted by the guide pins 56 so as to be supported at the lower limit position, and the edges of the incision and bend cutters 48 are positioned to be higher than the one face 27 of the attached permanent magnet 20 in which the notches 30 and 31 are formed.

When the jig head 43 is lowered toward the anvil (fixing block) 42, the outer wall end face 60 of the attachment guide member 57 causes the permanent magnet 20 to be pressingly inserted into the motor case 18 attached to the anvil (fixing block) 42, and the tip end faces of the projections 32 are pressingly contacted with the bottom face 65 of the case and then stops. Thereafter, the compression spring 54 is compressed and the edges of the incision and bend cutters 48 are lowered toward the end face 62 of the case.

At this time, the positional relationships in the circumferential direction between the permanent magnet 20 the rotation of which is locked by the keys 61, and the incision and bend cutters 48 which are guided by the square holes 64 are not changed.

EXAMPLE

An example of the method of mounting a permanent magnet according to the invention will be described with reference to FIGS. 7 and 8. When the motor case 18 is fittingly inserted into the concave mold 44 of the anvil (fixing block) 42, the recessed hole 39 and the through hole 40 of the motor case 18 are fitted onto the boss 46 and the pin 47, respectively, with the result that the motor case 18 is positioned in the predetermined direction and stably disposed. When the permanent magnet 20 is attached to the attachment guide member 57 as described above, the predetermined positional relationships are established between the magnetized positions and the motor case 18.

When the press machine (not shown) is operated and the jig head 43 is lowered toward the anvil (fixing block) 42, the permanent magnet 20 is pressingly inserted into the motor case 18 in accordance with the movement of the outer wall end face 60 of the attachment guide member 57, the tip ends of the projections 32 are pressingly contacted with the bottom face 65 of the case, and the downward movement then stops. In the subsequent step in which the core bar 51 compresses the compression spring 54 and lowers while pressing the permanent magnet 20, the incision and bend cutters 48 start to function. As enlargedly shown in FIG. 7(A), the end portion of the peripheral wall 36 of the opening 23 of the case is incised at a width which is slightly smaller than or substantially equal to the width of the fixing recesses 31.

In addition to the incision and bend cutters 48, the following means may be employed. As shown in FIG. 8, a caulking cutter 63 which has the cutting position different from the fixing recesses 31 and which corresponds to the height H of the permanent magnet 20 are formed at each of several positions which are other than the positions of the fixing recesses 31 and which are equivalently arranged in the circumference. The caulking cutters are simultaneously operated so that the permanent magnet 20 is caulked to the pressurized position by the shoulder portion of the outer periphery of the end face by similar means. The incised pieces formed by the cutters 48 are bent toward the inner side of the motor case 18 to form the engaging claws 25, and then bite into the fixing recesses 31 of the permanent magnet 20. Therefore, the positional relationships between the magnetized positions of the permanent magnet 20 and the motor case 18 in the circumferential direction is determined and the engaging claws 25 press the external angle of the bottom faces of the fixing recesses 31. The incised pieces formed by the cutters 63 caulk the outer periphery of the end face of the permanent magnet 20. In this way, the incised pieces formed by the cutters 48 and 63 cooperate with the bottom face 65 of the case to clamp and fix the permanent magnet 20 between the pieces and the bottom face.

As described above, in the mounting jig 41, the permanent magnet 20 are positioned by the positioning recesses 30 and the keys 61 which are similar to the keys 35 of the magnetizing head 33, and fixed in the portions of the fixing recesses 31 by plastic working which is performed on the end face 62 of the motor case 18 by the incision and bend cutters 48. According to this configuration, both the magnetization and the mounting can be performed by using the same reference, i.e., the positioning recesses 30 of the permanent magnet 20, and hence the accuracy of the magnetized positions of the permanent magnet 20 with respect to the motor case can be ensured. Consequently, torque ripple and cogging of the motor can be reduced.

As described above, in the method of mounting a permanent magnet according to the invention, a positioning recess is formed in an end face of the permanent magnet so that the positioning of the magnetization and that of the mounting of the magnet to the case are performed. Therefore, the assembly accuracy of the magnetized positions are largely improved. The positioning recess, the fixing recess, and the projection can prevent the front and rear of the magnet and the directions of the magnetized positions with respect to the rotational direction from being erroneously recognized. As a result, torque ripple and cogging of the motor can be reduced.

Moreover, the fixing recess is additionally formed in the end face of the permanent magnet and the permanent magnet is fixed by bending the end face of the case. Therefore, it is not required to use an adhesive agent, and the permanent magnet can be detached so as to be reused, whereby the amount of wastes can be reduced.

The projection formed on the other face of permanent magnet facilitates the adjustment of the magnetic center in the thrust direction with respect to the armature core, and reduce the working margin of the permanent magnet so that the material cost is reduced. As a result, the production cost can be extremely lowered.

Further, the recess is formed on one end face of the permanent magnet and the projection is formed on the other end face at the position corresponding to the recess. When permanent magnet blanks before assembly are to be accumulated, therefore, the magnets can be sequentially stacked while the recess of a magnet is inserted onto the projection of the adjacent magnet. Consequently, the stability in the lateral direction can be ensured, and this configuration is convenient for storage and transportation.

What is claimed is:

1. A method of mounting a permanent magnet comprising the steps of:

forming a positioning recess and a fixing recess in one end face of an annular permanent magnet;

applying predetermined magnetization on said permanent magnet under a condition that a projection which is to be engaged with said positioning recess is disposed on a magnetizing device and said projection of said magnetizing device is engaged with said positioning recess of said permanent magnet, thereby positioning said permanent magnet;

positioning said positioning recess of said permanent magnet which has undergone said magnetizing step, with respect to a mounting jig;

positioning a cylindrical motor case on said mounting jig;

fittingly inserting said permanent magnet which has been positioned, into said motor case which has been positioned; and plastically deforming a part of said motor case and engaging said part with said fixing recess of said permanent magnet, thereby fixing said permanent magnet.

2. A method of mounting a permanent magnet according to claim 1, wherein said positioning recess and said fixing recess are a common recess.

3. A method of mounting a permanent magnet according to claim 1, wherein said positioning recess and said fixing recess are formed at different positions and the engagement with said projection of said magnetizing device is restricted only to the engagement with said positioning recess.

4. A method of mounting a permanent magnet according to claim 1, wherein a projection of a predetermined height is formed on the other end face of said permanent magnet and at a position which corresponds to said positioning recess or said fixing recess.

5. A method of mounting a permanent magnet according to claim 4, wherein one of positioning recess and fixing recess is formed in a plurality of numbers, said projection is formed in a plurality of numbers in accordance with number of one of said positioning recess and said fixing recess, and said projections have a uniform height.

* * * * *